A. G. KALB.
CONDENSING FLUID SUBSTANCES.
APPLICATION FILED JULY 30, 1909.

957,685.

Patented May 10, 1910.
2 SHEETS—SHEET 2.

Witnesses
W. R. Williams
Henderson F. Hill

Inventor
Albert G. Kalb
By Robertson & Johnson
Attorneys

UNITED STATES PATENT OFFICE.

ALBERT G. KALB, OF CHICAGO, ILLINOIS, ASSIGNOR TO NATURAL DRY PRODUCTS COMPANY, OF AUGUSTA, MAINE, A CORPORATION OF MAINE.

CONDENSING FLUID SUBSTANCES.

957,685.  Specification of Letters Patent.  Patented May 10, 1910.

Application filed July 30, 1908. Serial No. 446,169.

*To all whom it may concern:*

Be it known that I, ALBERT G. KALB, a citizen of the United States of America, and resident of Chicago, in the county of Cook and State of Illinois, have invented certain new and useful Improvements in Condensing Fluid Substances, of which the following is a specification.

This invention relates to improvements in apparatus for condensing fluid substances and the invention is adapted more particularly for condensing milk.

The object of my invention is to invent a simple apparatus which will make it possible to condense milk economically without the use of undue heat. In the preferred form of my invention the material to be condensed is contained in a suitable tank which may be heated as by a water or steam jacket and with this tank I employ a spraying chamber in which the material to be condensed is introduced in the form of a fine spray and at the same time subjected to a constantly maintained current of dry warm air, the said air being replenished in great volume and acts upon the sprayed milk to take up the liquid particles of the same and the air is then forced through the body of the milk and out of the tank in any desirable way.

My invention consists of the apparatus as illustrated in its preferable embodiment in the accompanying drawings and as hereinafter more particularly described and then claimed.

Figure 1:
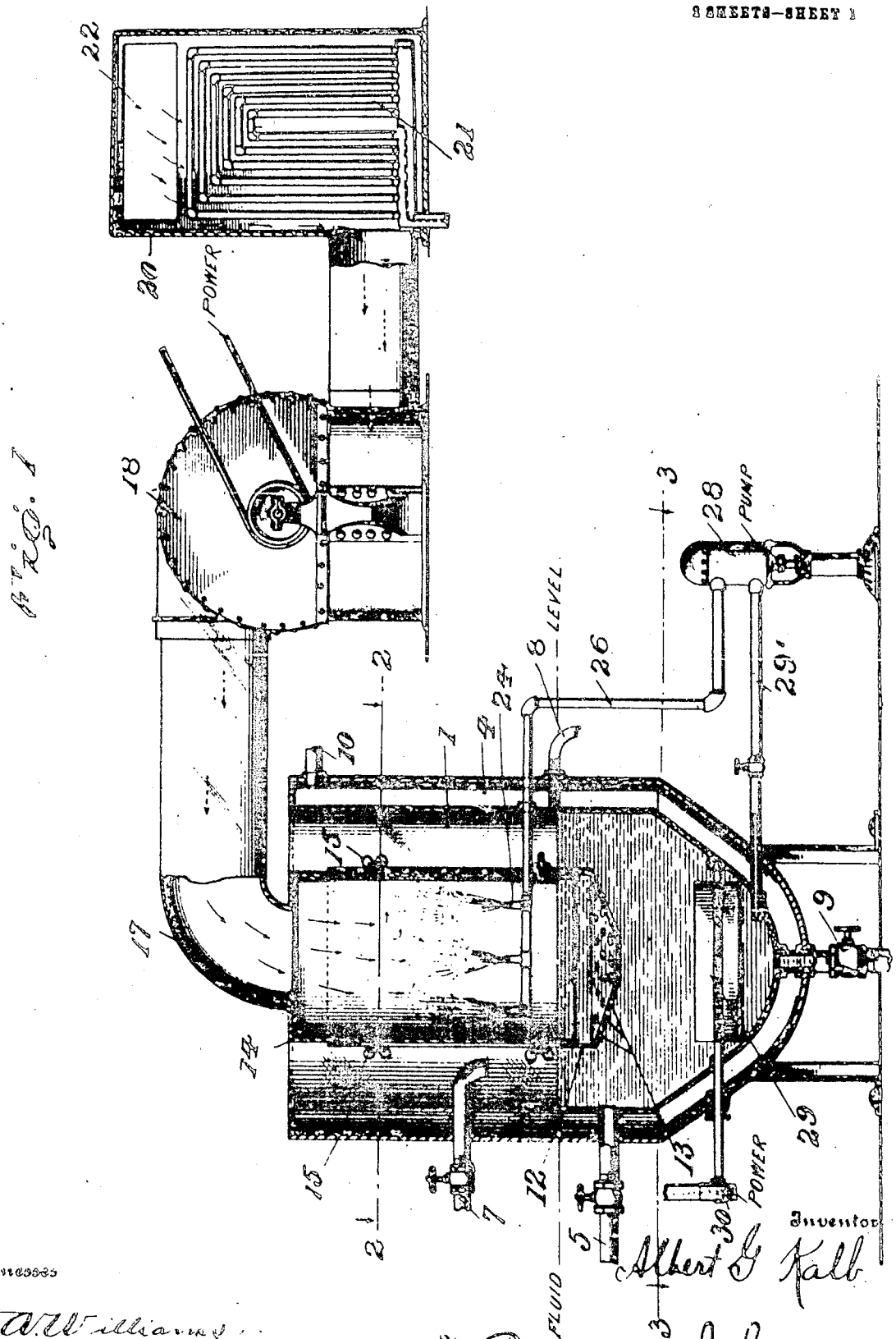
Figure 2:
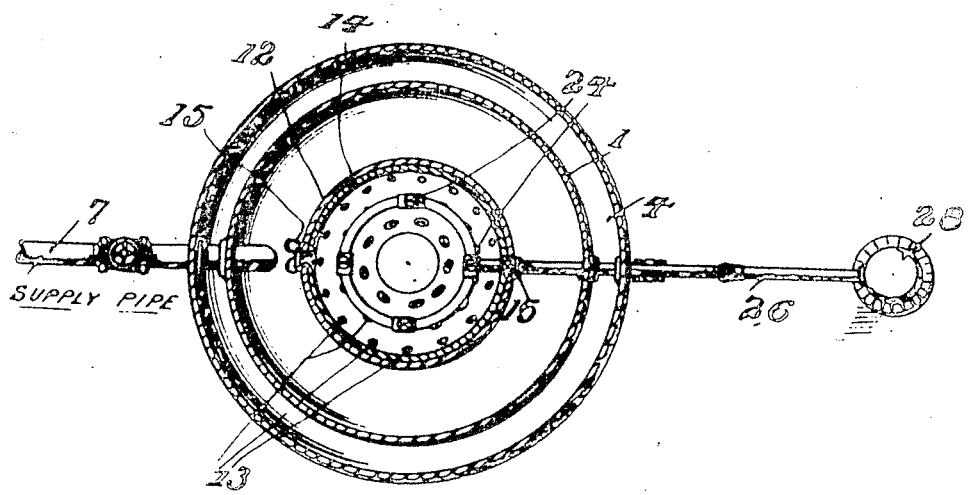
Figure 3:
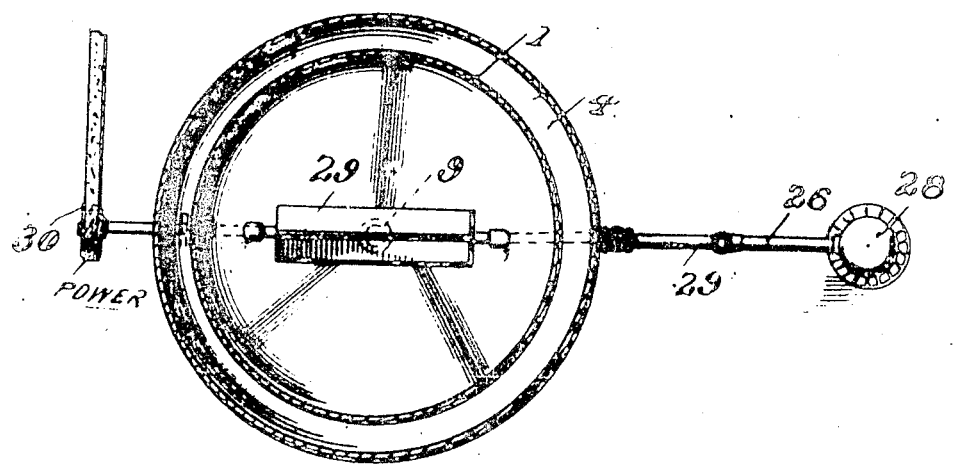

In the drawings accompanying and forming part hereof Figure 1 is a view, part in side elevation but mostly in vertical section, of apparatus constructed in accordance with my invention. Fig. 2 is a horizontal section through the line 2, 2 of Fig. 1. Fig. 3 is a horizontal section through the line 3, 3 of Fig. 1.

Referring now to the details of the drawings by numerals: 1 designates a tank which may be open at the top as illustrated and which is provided with a heating jacket 4 to which a heating medium may be supplied through the pipe 5 shown in Fig. 1. The tank also is provided with a supply pipe 7, an overflow 8, and a discharge pipe 9.

Within the tank is a spraying chamber formed of two telescopic members 12 and 14, the member 12 being adjustably supported by the member 14 by means of wing nuts 15 so that the member 12 may be lowered within the tank 1 as may be necessary in order to insure that the lower end of said tank shall always be submerged in the material to be condensed and to make it possible to lower said member 12 as the fluid substance lowers in the operation of condensing the same. The member 14 is provided with an inlet pipe 17 of large area which is connected with a blower 18 which exhausts air from a heating chamber 20 provided with a heater 21 and an inlet 22, the whole being so arranged that all the air which is fed by the blower 18 to the spraying chamber 14 must enter through the inlet 22 and be subjected to the drying and warming action of the heating coils of the heater 21.

The lower adjustable member 12 of the spraying chamber is provided with perforations 13 through which the material to be condensed passes and finds the same level within the spraying tank as it does in the condensing tank 1. The spraying chamber is also provided with a series of spraying devices or atomizers 24 supplied by a pipe 26 connected with a pump 28 and this pump connects with the bottom of the tank 1 by means of the pipe 29' and by the action of the pump 28 the material being condensed is drawn from the tank 1, forced through the pipe 26 through the spraying devices 24, where it is subjected to the action of large volumes of constantly supplied heated and dried air introduced into the spraying chamber by means of the aforesaid blower 18. Within the bottom of the tank 1 is also provided an agitator 29 operated from a pulley 30 and this agitator 29 is adapted to create a slight current in the liquid to be condensed by drawing said material down one side of the chamber and permitting it to flow up the other side, thus keeping the material of uniform consistency.

The operation of my invention is as follows: By means of the blower 18, air in large volume is drawn through the inlet 22 and heated and dried by heater 21 and forced through the inlet 17 into the spraying chamber. In order to find exit from this spraying chamber the air must pass down through the perforations 13 in the lower member 12 of said tank and pass through the material to be condensed where it may escape freely through the open top of the tank 1 but in doing this the large volume of air introduced into the spraying chamber comes in contact with the sprayed or atomized particles from the spraying devices 24 and of course tends to absorb to a large extent the liquid from said particles, thereby carrying off the moisture from these atomized particles and gradually condensing the material to any extent desired. As the material is condensed, it is necessary to lower the adjustable member 12 so as to keep its perforated end surrounded by the material being condensed and when said material is condensed to the desired consistency it may be delivered through the discharge pipe 9, and a new supply of liquid subjected to the condensation process.

From the foregoing and the accompanying drawings, it will be seen that I have invented apparatus for condensing fluid substances which is of extremely simple and effective form, by atomizing or spraying the liquid into a spraying chamber in which is constantly maintained a current of dry warm air which is renewed in sufficient quantities to thoroughly absorb the moisture from the sprayed particles. It will be seen that I obtain the desired result rapidly and economically.

It is obvious that changes may be made in my invention without departing from the spirit thereof, the scope of the invention being set forth by the appended claims.

What I claim as my invention is:

1. In apparatus for condensing fluid substances, a vessel for containing the material being treated, a spraying or atomizing chamber, means for forcing a current of air into said spraying or atomizing chamber and through the material in said vessel, and means for spraying or atomizing the material into the air current, substantially as described.

2. In apparatus for condensing fluid substances, a vessel for containing the material being treated, a spraying or atomizing chamber located in said vessel, a spraying or atomizing device located in said chamber, and means for introducing a current of air into said spraying chamber and through the material in said vessel, substantially as described.

3. In apparatus for condensing fluid substances, a vessel for containing the material being treated, a spraying or atomizing chamber located in said vessel, a spraying or atomizing device in said chamber, said chamber having a perforated bottom adapted to be immersed in the liquid in said vessel, and means for introducing to said chamber a current of air, whereby the air as it is forced through the openings in the bottom of the chamber is subjected to a spray, and is forced through the material being condensed, substantially as described.

4. In apparatus for condensing fluid substances, a vessel for containing the material being treated, a spraying or atomizing chamber, means for forcing a current of air into said spraying or atomizing chamber and through the material in said vessel, a spraying device for spraying the material into the air current before its passage through said material, and an agitator for creating a current in said material, substantially as described.

5. In apparatus for condensing fluid substances, a vessel for containing the material being treated, a spraying or atomizing chamber having a perforated bottom adapted to be immersed in the liquid in said vessel, said bottom being arranged to be raised or lowered, means for forcing a current of air into said chamber and through the material in said vessel or tank, and means for spraying the liquid into the air current before its passage through said material, substantially as described.

6. In apparatus for condensing fluid substances, a vessel for containing the material being treated, a spraying or atomizing chamber, means for forcing a current of air into said spraying or atomizing chamber, and means for forcing the material from said vessel and spraying it into said chamber, substantially as described.

7. In apparatus for condensing fluid substances, a vessel for containing the material being treated, said vessel having a heating jacket, a spraying or atomizing chamber, means for forcing a current of air into said spraying or atomizing chamber, and means for forcing the material from said vessel, and spraying it into said chamber, substantially as described.

8. In apparatus for condensing fluid substances, a vessel for containing the material being treated, a spraying or atomizing chamber having a perforated bottom adapted to be immersed in the material in said vessel, means for forcing a current of air into said spraying or atomizing chamber, and means for withdrawing the material from said vessel and spraying it into said chamber, substantially as described.

9. In apparatus for condensing fluid substances, a vessel for containing the material being treated, a spraying or atomizing chamber having a perforated bottom adapted to be immersed in the material in said vessel, said bottom being adapted to be raised or lowered in said vessel, means for forcing a current of air into said spraying or atomizing chamber, and means for forcing the material from said vessel and spraying it into said chamber, substantially as described.

10. In apparatus for condensing fluid substances, a vessel for containing the material being treated, a spraying or atomizing chamber having a perforated bottom adapted to be immersed in the material in said vessel, said bottom being adapted to be raised or lowered in said vessel; means for forcing a current of air into said spraying or atomizing chamber, means for forcing the material from said vessel and spraying it into said chamber, and an agitator for creating a current in the material being treated, substantially as described.

11. In apparatus for condensing fluid substances, a vessel for containing the material being treated, a spraying or atomizing chamber comprising two telescopic parts, the lower one having a perforated bottom adapted to be immersed in the material in said vessel, means for forcing a current of air into said spraying or atomizing chamber and through the material being treated, and means for forming a spray in said chamber as the air is passed through it, substantially as described.

12. In apparatus of the character described, a vessel for containing the material being treated, a spraying or atomizing chamber, means for forcing a current of air into said spraying or atomizing chamber, means for heating or drying the air previous to its passage through said chamber, and means for spraying the material being treated in said spraying chamber and subjecting the current of air to said spray, substantially as described.

13. In apparatus for condensing fluid substances, a vessel for containing the material being treated, having a heating jacket, a spraying or atomizing chamber located in said vessel and having a perforated bottom adjustably supported in position, a spraying device located in said spraying chamber, a pump for forcing the material in said vessel through said spraying device, and means for forcing a current of air into said spraying vessel and through its perforated bottom, substantially as described.

14. In apparatus for condensing fluid substances, a vessel for containing the material being treated, having a heating jacket, a spraying or atomizing chamber located in said vessel and having a perforated bottom adjustably supported in position, a spraying device located in said spraying chamber, a pump for forcing the material in said vessel through said spraying device, means for forcing a current of air into said spraying vessel and through its perforated bottom, and a device for heating a current in the material being treated, substantially as described.

Signed by me at Chicago, Illinois this 28th day of July 1908.

ALBERT G. KALB.

Witnesses:
  BERT. E. NEIL,
  WM. J. NEIL.